United States Patent [19]

Eaton

[11] 4,149,300
[45] Apr. 17, 1979

[54] CONTROLLED LATCHING MECHANISM

[76] Inventor: Roy Eaton, 1706 Jefferson, Anchorage, Ak. 99503

[21] Appl. No.: 743,461

[22] Filed: Nov. 19, 1976

[51] Int. Cl.$^2$ .............................................. A44B 21/00
[52] U.S. Cl. ............................... 24/230 AL; 24/211 N
[58] Field of Search ........ 24/230 R, 230 SH, 230 SL, 24/230 AK, 230 AL, 230 AM, 230 AN, 211 N, 194, 201 TR, 115 F, 136 A; 294/83 AA

[56] References Cited

U.S. PATENT DOCUMENTS

| | | | |
|---|---|---|---|
| 739,655 | 9/1903 | Detwiler | 24/230 |
| 1,923,025 | 8/1933 | Morse et al. | 24/211 N |
| 3,074,378 | 1/1963 | Clayton | 24/230 SL |

FOREIGN PATENT DOCUMENTS 2341601  2/1975  Fed. Rep. of Germany ..... 24/230 AL

Primary Examiner—Kenneth J. Dorner
Attorney, Agent, or Firm—Terrance A. Turner

[57] ABSTRACT

A latching mechanism is disclosed which features a bi-directionally movable controlled inclined plane that engages a ball bearing on its inclined surface. When the inclined plane moves in a first direction, the ball bearing moves upward through a cylindrical slot to engage a connecting ring to which a towline is attached; and when the inclined plane moves in the opposite direction, the ball bearing rotates, drops downward through the slot and releases the ring and towline.

12 Claims, 7 Drawing Figures

CONTROLLED LATCHING MECHANISM

BACKGROUND OF THE INVENTION

1. Field of the Invention

This invention relates in general, to latching mechanisms and, in particular, to controlled latching mechanisms featuring spherically shaped keeper components.

2. Prior Art

A wide variety of latching mechanisms have been designed which feature capabilities for both reliable coupling and controlled releasing of components subjected to opposing tension stress. Some of the better mechanisms feature ball bearings spring loaded into recesses which are substantially perpendicular to slots in which removable latch members are insertable. When a latch member is inserted into such a slot, the ball bearing engages an opening in the latch member and acts as a keeper component which prevents the latch member from being withdrawn.

These mechanisms are usually designed such that when a pre-selected minimal tension is applied to the latch member, the ball bearing is forced back into the recess and the latch member disengages from the slot. Examples of this general principle are taught and illustrated in U.S. Pat. No. 3,704,633 issued to Mr. K. E. Iverson and in U.S. Pat. No. 3,473,201 issued to Mr. T. Hopka, et al. A modification of this general principle is taught and illustrated in U.S. Pat. No. 3,628,821 issued to Mr. A. Reece. In the Reece latching mechanism, two spring loaded ball bearings are configured to oppose one another and couple a removable latch having an opening through which the ball bearings contact one another. Release occurs only when a device sensitive to water pressure at a pre-determined depth releases the opposing spring forces holding the ball bearings in contact with one another.

Such a use of ball bearings in latching mechanisms advantageously provides a quick substantially frictionless release under stress and materially reduces the possibility that the latch members will either bind up or fail to release altogether. The Iverson and Hopka devices have the disadvantage, however, that they are configured to release only in response to a pre-selected tension on the opposing latch members. Accordingly, they are unsuitable for manually or remotely operated controlled release mechanisms. While the Reece mechanism does not suffer from such a deficiency, it is nonetheless complicated, bulky and adapted to operate only in an underwater environment.

Accordingly, it is an object of this invention to provide a small simple latching mechanism which features a ball bearing that moves in a recess to act as a keeper component and provides both reliable coupling and controlled releasing capabilities.

SUMMARY OF THE INVENTION

The invention lies in a controlled release latching mechanism which features a first recessed slot in which a connecting ring is insertable, a second recessed slot located beneath the first slot into which an inclined plane is insertable, and a third substantially cylindrically shaped slot perpendicularly connecting the first and second slots. A ball bearing rests in the third slot and engages the inclined surface of a bi-directionally movable inclined plane, such that when the plane is inserted into the second slot the ball bearing raises a sufficient distance upward through the third slot into the first slot, engages the connecting ring, and prevents the ring from being withdrawn from the first slot. When the inclined plane is withdrawn from the second slot, the ball bearing drops downward through the third slot a sufficient distance to disengage the connecting ring and permit the ring to be withdrawn from the first slot. Advantageously, the friction between the ball bearing and the inclined surface of the plane causes the ball bearing to roll in a direction to assist the rapid disengagement of the ring.

DETAILED DESCRIPTION OF THE INVENTION

Figure 1:
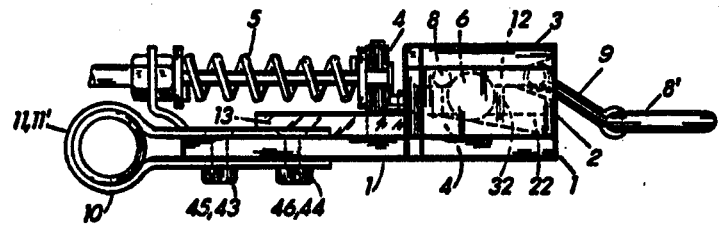
FIG. 1 depicts a side view of the latching mechanism.
Figure 2:
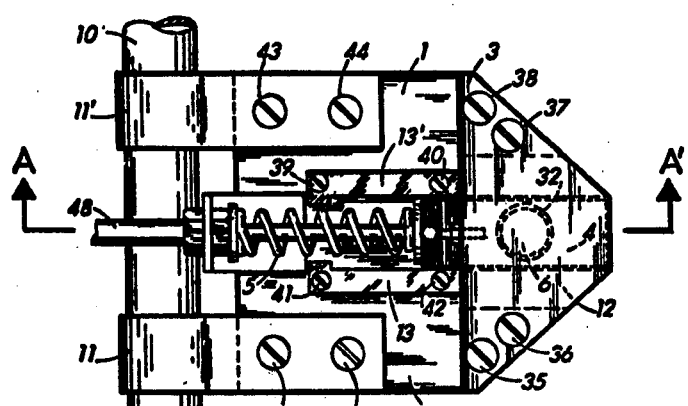
FIG. 2 illustrates a top plan view of the latching mechanism, alligned to relate to the side view depicted in FIG. 1.
Figure 3:
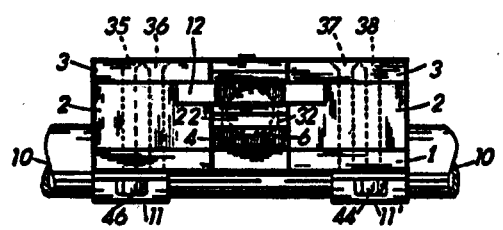
FIG. 3 shows a front end view of the latching mechanism, aligned to relate to the side and top views of the mechanism illustrated in FIGS. 1 and 2.
Figure 4:
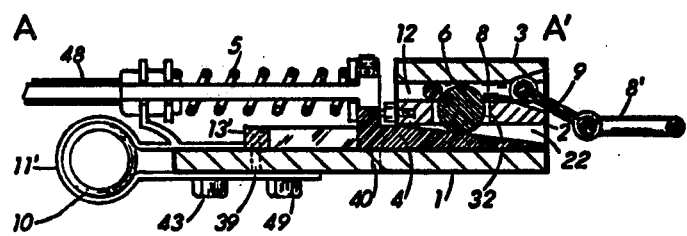
FIG. 4 reveals a cut-away side view of the assembled latching mechanism.
Figure 5:
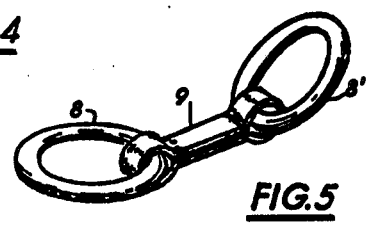
FIG. 5 depicts a perspective view of an advantageous ring mechanism for connecting a towline to the latching mechanism.

The preferred embodiment of the controlled latching mechanism which is the subject of this invention is primarily comprised of three plates, a base plate 1, an intermediate plate 2 and a cap plate 3. Base plate 1 is substantially rectangularly shaped, with the exception that one end thereof is tapered toward a blunted point and is bow shaped. Cap plate 3 and intermediate plate 2 are substantially of the same shape and size as the bow shaped end of base plate 1. The lower surface of cap plate 3 is juxtaposed the upper surface of intermediate plate 2, and the lower surface of intermediate plate 2 is juxtaposed the bow shaped portion of base plate 1, such that the resulting bow shaped structure raises significantly above the upper surface of base plate 1.

Any number of well-known structural ties are suitable for fixedly attaching cap plate 3 and intermediate plate 2 to one another and to base plate 1. However, in practice, machine bolts 35, 36, 37 and 38 connecting through the three plates 1, 2 and 3 at advantageous locations have been found to provide sufficient structural strength to prevent cap plate 3 and intermediate plate 2 from shearing away from base plate 1 or from one another when the latching mechanism is subjected to stress.

Intermediate plate 2 features two substantially parallel recessed slots 12 and 22 on opposite sides thereof. Slot 12 is configured within the surface of intermediate plate 2 facing cap plate 3, and slot 22 is configured within the surface of intermediate plate 2 facing base plate 1. The length, width and depth of slot 12 are chosen such that a connecting ring 8 is just insertable therein when cap plate 3 is attached to the upper surface of intermediate plate 2. The length, width and depth of slot 22 are chosen to permit a moveable inclined plane 4 to be insertable therein when intermediate plate 2 is attached to base plate 1. Slots 12 and 22 are connected by a cylindrically shaped slot 32 which is oriented substantially perpendicular to slots 12 and 22.

The upper surface of base plate 1 to which intermediate plate 2 is attached is configured with a track to permit inclined plane 4, which rests therein, to be either mechanically or electro-mechanically inserted by an actuating mechanism 5 into slot 22 and withdrawn from the same. The track is advantageously defined by parallel rails 13 and 13', connected to base plate 1 by machine bolts 39, 40, 41 and 42, as a substitute for or in connection with an actual groove in the surface of base plate 1. Also, the lower surface of inclined plane 4 adjacent the upper surface of plate 1 is often, in practice, grooved in the direction of movement of plane 4 to reduce the friction between plane 4 and plate 1.

Spherically shaped ball bearing 6, having a diameter just smaller than that of cylindrically shaped slot 32, rests in slot 32 such that, when inclined plane 4 is either wholly or partially inserted in slot 22, ball bearing 6 rests on the inclined surface thereof. The slope of inclined plane 4, the distance between the parallel surfaces of slots 12 and 22, the diameter of cylindrical slot 32, the diameter of spherically shaped ball bearing 6 and the depth of slot 12 in a direction perpendicular to that of the parallel surfaces of slots 12 and 22 are chosen such that when inclined plane 4 is fully inserted into slot 22, plane 4 forces ball bearing 6 a sufficient distance upward through cylindrical slot 32 to cause ball bearing 6 to contact the lower surface of cap plate 3; and when inclined plane 4 is partially or fully withdrawn from slot 22, the upper surface of ball bearing 6 drops down slot 32 beneath the lower surface of slot 12.

As a result, when connecting ring 8 is fully inserted into slot 12 and inclined plane 4 is fully inserted into a slot 22, ball bearing 6 passes through the loop of connecting ring 8, engages the lower surface of cap plate 3 and prevents connecting ring 8 from being withdrawn from slot 12. Correspondingly, when inclined plane 4 is withdrawn from slot 22, ball bearing 6 drops down through slot 32 to a level which permits connecting ring 8 to be quickly withdrawn from slot 12. Advantageously, the friction between the inclined surface of plane 4 and ball bearing 6 when plane 4 is being withdrawn from slot 22 causes ball bearing 6 to rotate in such a direction as to assist the withdrawal of connecting ring 8. Due to the direction of this rotation, the release is substantially frictionless and prevents connecting ring 8 from binding up against the lower surface of cap 3 and ball bearing 6 during the release process.

In practice, plane 4 is inserted into slot 22 a sufficient distance to cause ball bearing 6 to engage connecting ring 8, but an insufficient distance to cause ball bearing 6 to actually contact the lower surface of plate 3. The reason for this is to preclude the possibility of ball bearing 6 causing a dent on the lower surface of plate 3 which might cause either ball bearing 6 or connecting ring 8 to hang up when a quick release is desired.

Figure 6:
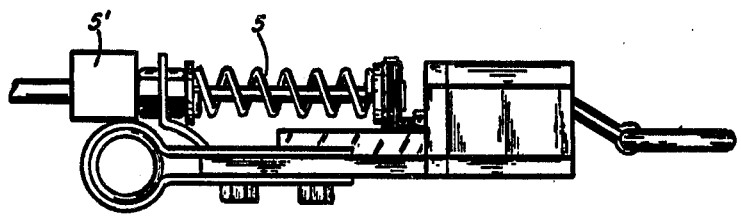
FIGS. 6 and 7 illustrate on advantagous electromechanical device for the actuating means which induces bi-directional movement in the inclined plane.
Figure 7:
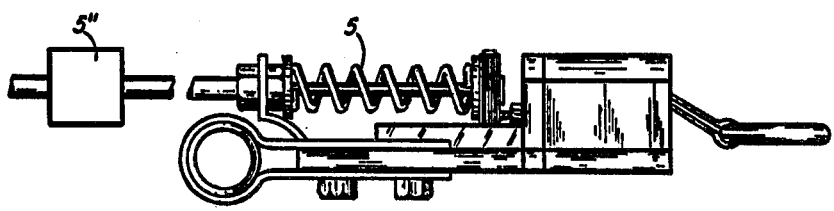

Actuating mechanism 5 is simply required to insert inclined plane 4 into slot 22 when a coupling is to be made and to withdraw inclined plane 4 from slot 22 when a release is to be made. In practice, actuating means 5 is a spring loaded cable controlled device fixedly attached to base plate 1 by machine bolts 43, 44, 45 and 46. In its normal state, partially compressed spring 47 in actuating mechanism 5 retains inclined plane 4 within slot 22, with the resulting effect the ball bearing 6 is forced upward through slot 32 to engage the lower surface of cap plate 3 and thereby prevent connecting ring 8 from being withdrawn from slot 12. When connecting ring 8 is to be released, tension is applied to cable 48 to further compress spring 47 and withdraw plane 4, which is fixedly attached to spring 47, from slot 22; ball bearing 6 then drops downward into slot 32 and provides a quick substantially frictionless release of connecting ring 8 and any towline attached thereto. As is shown in FIGS. 6 and 7, the actuating means may also advantageously be any well known attached or remote electro-mechanical device, such as a solenoid 5' or 5", which is capable of inducing the same bi-directional movement in inclined plane 4.

In practice, the latching mechanism is required to provide coupling between components which transmit opposing force vectors oriented at a wide variety of angles. Accordingly, the latching mechanism is configured to respond to not only a wide variety of tow line force vectors in the plane defined by the top surfaces of base plate 1, intermediate plate 2 and cap plate 3, but also in the plane defined by the respective directions of movement of inclined plane 4 and ball bearing 6. The primary reason why cap plate 3, intermediate plate 2 and the corresponding end of base plate 1 are substantially bow shaped is to provide a wide angle in the plane of the surfaces of plates 1, 2 and 3 from which force vectors emanating through connecting ring 8 can be directed without causing either connecting ring 8 or a tow line attached thereto to bind up against the leading edge of slot 12 where connecting ring 8 is insertable.

Base plate 1 is advantageously attached through connecting strips 11 and 11' (also connected to base plate 1 by machine bolts 43, 44, 45 and 46) to a cylindrical bar 10, such that base plate 1 and the remainder of the latching mechanism rotate about cylindrical bar 10 and aligns themselves with force vectors emanating through connecting ring 8 in a plane defined by the respective movements of inclined plane 4 and ball bearing 6. The bottom surface of cap plate 3 and the top surface of intermediate plate 2 within slot 12 are advantageously tapered to meet the leading edges thereof to prevent tow lines attached to connecting ring 8 from binding against such leading edges. As a further prevention against any such binding, a second connecting ring 8' is advantageously attached to connecting ring 8 through a strap 9. The advantage of such a dual connecting ring arrangement is, when connecting ring 8 is inserted in slot 12, strap 9 rests against either the tapered leading edge of cap plate 3 or the tapered leading edge of intermediate plate 2, depending upon the orientation of the tow line force vector at that particular moment; and connecting ring 8 and connecting ring 8' are free to rotate in planes both parallel and perpendicular to the respective cross sections thereof. Further, since connecting ring 8 extends beyond slot 12 when connecting ring 8 is inserted within slot 12, connecting ring 8 is free to respond to an increased variety of orientations of tow line force vectors.

Although the embodiment of the invention described herein is the preferred embodiment of the invention, this embodiment is merely illustrative of the principles of the invention taught herein; and it is understood that numerous other arrangements and embodiments of the invention may be devised by those skilled in the art without departing from the spirit and scope of this invention.

I claim:

1. A controlled latching mechanism comprising a structure which includes:

a. a first slot into which a connecting ring is insertable;

b. a movable inclined plane;
c. a second slot, substantially parallel to and beneath said first slot, into which said inclined plane is insertable;
d. a third slot connecting said first and second slots, said third slot being
  (i) substantially, cylindrically shaped, and
  (ii) substantially perpendicularly oriented with respect to said first and second slots;
e. substantially spherically shaped means, resting in said third slot, for engaging the inclined surface of said plane, said engaging means having a diameter just smaller than that of said third slot; and
f. means for
  (i) inserting said inclined plane into said second slot a sufficient distance to cause said engaging means to move into said first slot a sufficient distance to engage a latch inserted therein, and
  (ii) withdrawing said inclined plane from said second slot a sufficient distance to cause said engaging means to withdraw from said first slot a sufficient distance to disengage a latch inserted therein.

2. A latching mechanism in accordance with claim 1 in which:
   a. said inserting and withdrawing means is fixedly attached to said inclined plane; and
   b. said inserting and withdrawing means responds to a mechanical inducement to insert said inclined plane into said second slot and withdraw it from the same.

3. A latching mechanism in accordance with claim 1 in which:
   a. said inserting and withdrawing of means is fixedly attached to said inclined plane; and
   b. said inserting and withdrawing means responds to an electro-mechanical inducement to insert said inclined plane into said second slot and withdraw it from the same.

4. A controlled latching mechanism comprised of
   a. a base plate;
   b. a moveable inclined plane;
   c. an intermediate plate, the lower side of which is fixedly attached to said base plate, having
     (i) a first slot on the upper side thereof sufficient for inserting a tow line connecting ring,
     (ii) a second slot on the lower side thereof sufficient for inserting said inclined plane, and,
     (iii) a third slot connecting said first and second slots;
   d. a cap plate fixedly attached to the upper side of said intermediate plate;
   e. means, resting in said third slot for engaging the inclined surface of said plane; and
   f. singular means for both
     (i) inserting said inclined plane into said second slot a sufficient distance to cause said engaging means to move through said third slot and into said first slot a sufficient distance to engage a connecting ring inserted in said first slot, and
     (ii) withdrawing said inclined plane from said second slot a sufficient distance to cause said engaging means to withdraw from said first slot through said third slot a sufficient distance to disengage a connecting ring inserted in said first slot.

5. A latching mechanism in accordance with claim 4 in which:
   a. said engaging means a substantially spherically shaped;
   b. said second slot is substantially parallel to and located beneath said first slot; and
   c. said third slot
     (i) is substantially cylindrically shaped,
     (ii) has a diameter just larger than that of said engaging means, and
     (iii) is substantially perpendicularly oriented with respect to said first and second slots.

6. A latching mechanism in accordance with claim 5 in which:
   a. said inserting and withdrawing means is fixedly attached to said base plate;
   b. said base plate defines a track which restricts said inclined plane to bi-directional movement only within said track;
   c. said inserting and withdrawing means inserts said inclined plane into said second slot and withdraws it along said track.

7. A latching mechanism in accordance with claim 6 in which:
   a. said inserting and withdrawing means is fixedly attached to said inclined plane; and
   b. said inserting and withdrawing means mechanically inserts said inclined plane into said second slot and withdraws it from the same.

8. A latching mechanism in accordance with claim 6 in which:
   a. said inserting and withdrawing of means is fixedly attached to said inclined plane; and
   b. said inserting and withdrawing means electro-mechanically inserts said inclined plane into said second slot and withdraws it from the same.

9. A latching mechanism in accordance with claim 6 in which the end of said first slot into which a connecting ring is insertable is substantially bow shaped to permit sufficient movement of the connecting ring in the plane defined by the common surfaces of said plates to accomodate a variety of tow line force vectors in such plane.

10. A latching mechanism in accordance with claim 6 in which:
    a. the leading edge of said intermediate plate is tapered to meet the bottom surface of said first slot defined by said intermediate plate, and
    b. the leading edge of said cap plate is tapered to meet the top surface of said first slot defined by said cap plate, to accomodate a variety of two line force factors in a plane defined by the respective perpendicular directions of movement of said inclined plane and said engaging means.

11. A latching mechanism in accordance with claim 6 in which said inserting and withdrawing means responds to a mechanical inducement to insert said inclined plane into said second slot and withdraw it from the same.

12. A latching mechanism in accordance with claim 6 in which said inserting and withdrawing means responds to an electro-mechanical inducement to insert said inclined plane into said second slot and withdraw it from the same.

* * * * *